US008644277B2

(12) United States Patent
Zhang et al.

(10) Patent No.: US 8,644,277 B2
(45) Date of Patent: Feb. 4, 2014

(54) DYNAMIC SELECTION OF RANDOM ACCESS CHANNEL CONFIGURATIONS

(75) Inventors: Xiaoxia Zhang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 12/847,742

(22) Filed: Jul. 30, 2010

(65) Prior Publication Data

US 2011/0039499 A1  Feb. 17, 2011

Related U.S. Application Data

(60) Provisional application No. 61/231,890, filed on Aug. 6, 2009.

(51) Int. Cl.
*H04W 4/00* (2009.01)
(52) U.S. Cl.
USPC .......................... 370/338; 370/400; 370/465
(58) Field of Classification Search
USPC ......... 370/328–329, 335–336, 338, 342–343, 370/345, 389, 400, 437, 441–442, 465
See application file for complete search history.

(56) References Cited

U.S. PATENT DOCUMENTS

| 8,111,639 | B2* | 2/2012 | Imamura et al. | 370/278 |
|---|---|---|---|---|
| 8,130,667 | B2* | 3/2012 | Bertrand et al. | 370/252 |
| 8,199,710 | B2* | 6/2012 | Kato et al. | 370/329 |
| 8,446,859 | B2* | 5/2013 | Kim et al. | 370/328 |
| 2006/0252377 | A1* | 11/2006 | Jeong et al. | 455/67.13 |
| 2007/0171889 | A1* | 7/2007 | Kwon et al. | 370/350 |
| 2008/0267127 | A1* | 10/2008 | Narasimha et al. | 370/331 |
| 2008/0267134 | A1* | 10/2008 | Cheng et al. | 370/335 |
| 2009/0023448 | A1* | 1/2009 | Attar et al. | 455/436 |
| 2009/0028065 | A1 | 1/2009 | Iwai et al. | |
| 2009/0042582 | A1 | 2/2009 | Wang et al. | |
| 2009/0259910 | A1* | 10/2009 | Lee et al. | 714/748 |

(Continued)

FOREIGN PATENT DOCUMENTS

| WO | WO2007052972 | 5/2007 |
|---|---|---|
| WO | 2007091675 A1 | 8/2007 |
| WO | 2008081531 A1 | 7/2008 |

OTHER PUBLICATIONS

Huawei:3GPP Draft; R2-093684, 3rd Generation Partnership Project (3GPP), Mobile Competence Centre ; 650, Route Des Lucioles ; F-06921 Sophia-Antipolis Cedex ; France, no. Los Angeles, USA; 20090623, Jun. 23, 2009, XP050351926, [retrieved on Jun. 23, 2009] the whole document.

(Continued)

*Primary Examiner* — Kevin Mew
(74) *Attorney, Agent, or Firm* — Liem T. Do

(57) ABSTRACT

Systems and methodologies are described that facilitate dynamic selection of a random access channel configuration. Typically, a single random access channel configuration is utilized throughout a cell; however, the configuration employed, while appropriate for some mobile devices within the cell, can introduce unnecessary overhead for other mobile devices. A mobile device can measure a characteristic of a radio link between the mobile device and a base station. The measurement can be compared to a set of thresholds provided by the base station. Based upon the comparison, a random access channel configuration can be selected from a set of formats. The selected configuration can be utilized to initiate random access procedures.

40 Claims, 14 Drawing Sheets

(56) References Cited

U.S. PATENT DOCUMENTS

2009/0305693 A1    12/2009  Shimomura et al.
2010/0278114 A1*   11/2010  Kwon et al. .................. 370/328
2011/0141971 A1*    6/2011  Zhang et al. .................. 370/328
2012/0076042 A1*    3/2012  Chun et al. .................... 370/252

OTHER PUBLICATIONS

International Search Report and Written Opinion—PCT/US2010/044176, International Search Authority—European Patent Office—Nov. 19, 2010.

LG Electronics: "R1-070228 Multi-TTI RACH Allocation Methods" [Online] vol. RI-070228, No. 47BIS, Jan. 15, 2007, pp. 1-4, XP002502843, Retrieved from the Internet: URL:http://www.3gpp.org/ftp/tsg ran/WGI_RL I/TSGRI_47bis/Docs/> [retrieved on Nov. 6, 2008] the whole document.

LTE; Evolved Universal Terrestrial Radio Access (E-UTRA); Physical channels and modulation (3GPP TS 36.211 version 8.7.0 Release 8), Technical Specification, European Telecommunications Standards Institute (ETSI), 650, Route Des Lucioles ; F-06921 Sophia-Antipolis ; France, No. V8.7.0, Jun. 1, 2009, XP014044748, paragraph [5.7.1].

* cited by examiner

DYNAMIC SELECTION OF RANDOM ACCESS CHANNEL CONFIGURATIONS

CLAIM OF PRIORITY UNDER 35 U.S.C. §119

The present Application for Patent claims priority to U.S. Provisional Application Ser. No. 61/231,890, filed Aug. 6, 2009, entitled "PHYSICAL RANDOM ACCESS CHANNEL CONFIGURATIONS." The aforementioned U.S. Provisional Application is assigned to the assignee hereof and hereby expressly incorporated by reference in its entirety.

BACKGROUND

I. Field

The following description relates generally to wireless communications systems, and more particularly to facilitating dynamic selection of a physical random access channel (PRACH) configuration to be employed during a random access procedure.

II. Background

Wireless communication systems are widely deployed to provide various types of communication content such as voice and data. Typical wireless communication systems may be multiple-access systems capable of supporting communication with multiple users by sharing available system resources (e.g., bandwidth, transmit power, etc.). Examples of such multiple-access systems may include Code Division Multiple Access (CDMA) systems, Time Division Multiple Access (TDMA) systems, Frequency Division Multiple Access (FDMA) systems, Orthogonal Frequency Division Multiple Access (OFDMA) systems, and the like. Additionally, the systems can conform to specifications such as third generation partnership project (3GPP), 3GPP2, High Speed Packet Access (HSPA), High Speed Downlink Packet Access (HSDPA), High Speed Uplink Packet Access (HSUPA), 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Wireless communication systems can be configured to include a series of wireless access points, which can provide coverage for respective locations within the system. Such a network structure is generally referred to as a cellular network structure, and access points and/or the locations they respectively serve in the network are generally referred to as cells.

A mobile device, or user equipment (UE), can discover one or more cells within a wireless communication network and select at least one cell to access to utilize wireless communication services. Cell discovery can include detection of synchronization signals, determination of cell identities, acquisition of system timing, etc. Once one or more cells are discovered, the mobile device can select a cell to access. In one example, the mobile device can evaluate pilot or reference signals from discovered cells to identify a strongest cell, a closest cell, etc. In another example, the mobile device can select a discovered cell associated with an operator through which the mobile device has a service agreement.

Once a cell is selected, the mobile device can initiate random access procedures to access the cell. Random access procedures can be contention-based or contention free. In a contention-based random access attempt, the mobile device selects a random access preamble and transmits a preamble message on resources associated with a random access channel. The mobile device receives a random access response message which can include a timing adjustment, an identifier for the mobile device, an uplink grant for a subsequent message, etc. The mobile device can employ the uplink grant to transmit a message that includes a unique identifier of the mobile device. Subsequently, the mobile device receives a contention resolution message which echoes the unique identifier of the mobile device.

SUMMARY

In accordance with one or more embodiments and corresponding disclosure thereof, various aspects are described in connection with facilitating dynamic selection of a random access channel configuration. Typically, a single random access channel configuration is utilized throughout a cell; however, the configuration employed, while appropriate for some mobile devices within the cell, can introduce unnecessary overhead for other mobile devices. A mobile device can measure a characteristic of a radio link between the mobile device and a base station. The measurement can be compared to a set of thresholds provided by the base station. Based upon the comparison, a random access channel configuration can be selected from a set of formats. The selected configuration can be utilized to initiate random access procedures.

According to a first aspect, a method is described herein that can include measuring a characteristic of a radio link between a mobile device and a base station to generate a measurement value. In addition, the method can include selecting a random access channel format from a set of configurations in accordance with the measurement value.

Another aspect relates to a wireless communication apparatus. The wireless communication apparatus can include at least one processor configured to measure a characteristic of a radio link between the wireless communication apparatus and a base station to generate a measurement value. In addition, the at least one processor is further configured to select a random access channel format from a set of configurations in accordance with the measurement value.

Yet another aspect relates to an apparatus that can include means for measuring a characteristic of a radio link between the apparatus and a base station to generate a measurement value. In addition, the apparatus can further include means for selecting a random access channel format from a set of configurations in accordance with the measurement value.

Still another aspect relates to a computer program product that can comprise a computer-readable medium. The computer-readable medium can include code for causing at least one computer to measure a characteristic of a radio link between a mobile device and a base station to generate a measurement value. In addition, the computer-readable medium can include code for causing the at least one computer to select a random access channel format from a set of configurations in accordance with the measurement value.

In accordance with another aspect, an apparatus is described. The apparatus can include a measurement module that generates an estimate, wherein the estimate relates to at least one characteristic of a radio link between the apparatus and a base station. In addition, the apparatus can include a random access module that selects a random access channel format based at least in part on the estimate and employs the random access channel format selected to transmit a random access preamble to the base station.

DETAILED DESCRIPTION

Figure 1:
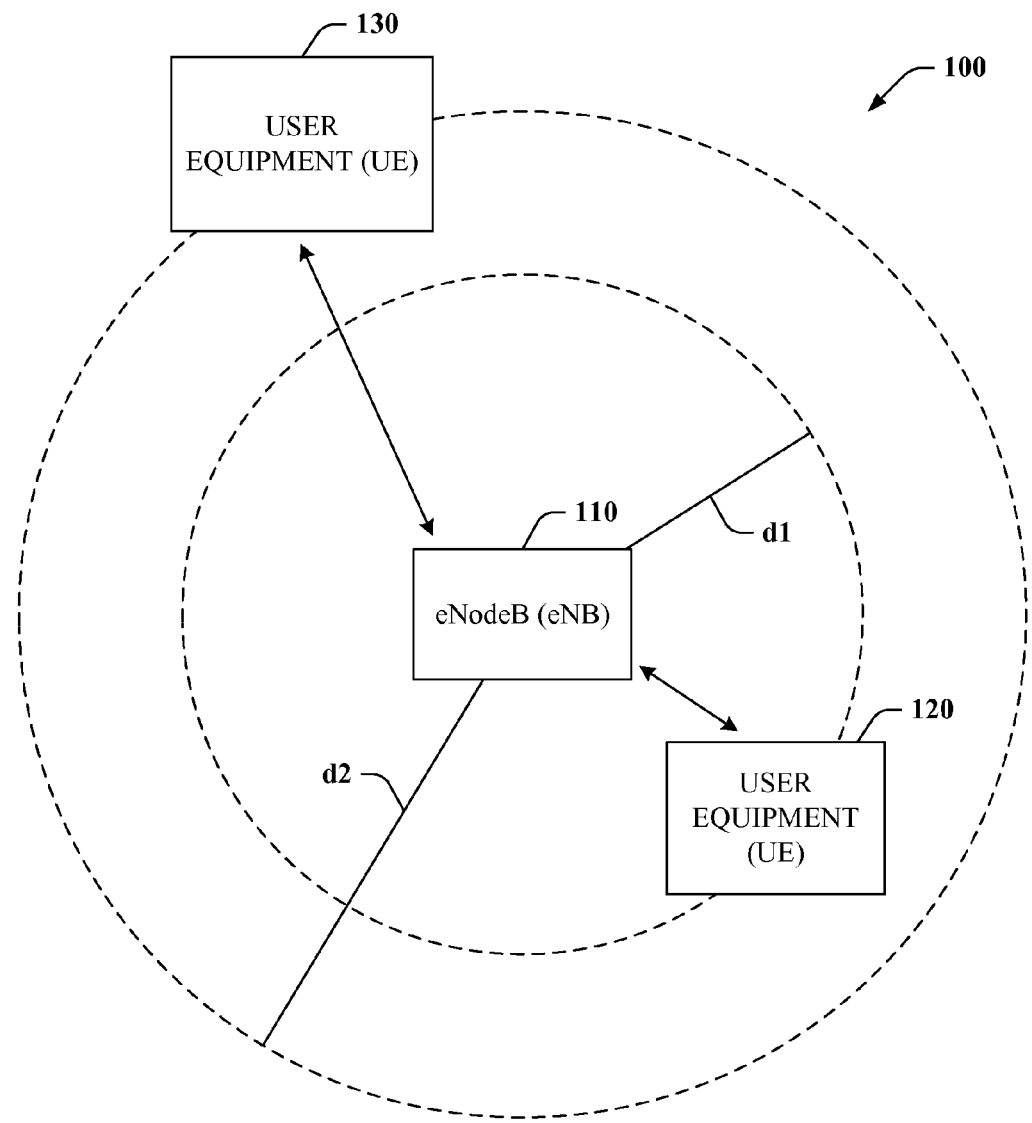
FIG. 1 illustrates an example wireless communication system that facilitates reducing overhead associated with random access in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single-Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, High Speed Packet Access (HSPA), High Speed Downlink Packet Access (HSDPA), High Speed Uplink Packet Access (HSUPA), etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release that uses E-UTRA, which employs OFDMA on the downlink and SC-FDMA on the uplink. HSPA, HSDPA, HSUPA, UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques. For clarity, terminology associated with WCDMA, HSPA, HSDPA, and HSUPA are employed in description below. However, it is to be appreciated that the claims appended hereto are not intended to be limited to WCDMA, HSPA, HSDPA, and HSUPA, unless explicitly done so.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules, etc., discussed in connection with the figures. A combination of these approaches can also be used.

Referring now to the drawings, FIG. 1 illustrates an example wireless communication system 100 that facilitates reducing overhead associated with random access in accordance with various aspects. Wireless communication system 100 includes a base station or eNodeB (eNB) 110, a first user equipment (UE) 120, and a second UE 130. eNB 110 and UE 120 can communicate with one another over a wireless link.

For instance, eNB 110 can transmit information to UE 120 over a downlink channel and UE 120 can transmit information to eNB 110 over an uplink channel. Similarly, UE 130 can also communicate with eNB 110 via respective uplink and/or downlink channels. While, to facilitate explanation, only one eNB (e.g., eNB 110) and two UEs (e.g., UEs 120 and 130) are illustrated in FIG. 1, it should be appreciated that system 100 can include any number of UEs and/or eNBs.

In addition, eNB 110 can be referred to as a base station, access point, an eNodeB, an evolved NodeB, a NodeB, etc. UEs 120 and UE 130 can be referred to as a mobile device, a mobile terminal, a mobile station, a station, a wireless terminal, or the like. Further, it should be appreciated that system 100 can operate in a 3GPP LTE or LTE-A wireless network, a WCDMA wireless network, an OFDMA wireless network, a CDMA network, a 3GPP2 CDMA2000 network, an EV-DO network, a WiMAX network, a HSPA network, etc. While aspects described below are explained with LTE terminology with respect to a LTE network and/or LTE radio access technology, it is to be appreciated that techniques described herein can be utilized within the above networks as well as in other wireless networks and/or radio access technologies.

In an aspect, eNB 110 can provide wireless communication coverage for a geographic area. The geographic area covered can be a denoted cell of eNB 110. Typically, UEs 120 and 130 can perform cell search to detect eNB 110. During a cell search, UE 120 and/or UE 130 can acquire frequency and symbol synchronization with a cell, such as a cell served by eNB 110, acquire frame timing of the cell, and ascertain a physical-layer cell identity associated with the cell. In an aspect, LTE supports 504 distinct physical-layer cell identities, wherein this set of cell identities is further divided into 168 cell-identity groups that include three cell identities each.

To facilitate cell search, eNB 110 can transmit a primary synchronization signal (PSS) and a secondary synchronization signal (SSS). The PSS, in an aspect, can be a length-63 Zadoff-Chu sequence extended with five zeros at the edges and mapped to a center 73 sub-carriers of the downlink. The PSS can take one of three different values, wherein each value specifies a cell identity within a cell identity group. After detecting the PSS, UE 120 and/or UE 130 can determine slot timing (e.g., 5 ms timing) of the cell and the cell identity within the cell identity group associated with eNB 110. After PSS detection, UEs 120 and 130 can detect the SSS transmitted by eNB 110. The SSS, in an aspect, can be two length-31 M-sequences interleaved together. The SSS can take one of 168 different values, wherein each value specifies a cell-identity group. After detecting the SSS, UEs 120 and 130 can determine the radio frame timing, the physical-layer cell identity associated with eNB 110, cyclic prefix length, and whether frequency division duplex (FDD) or time division duplex (TDD) is employed. After SSS detection, UE 120 and UE 130 can proceed to decode system information broadcasted on a physical broadcast channel (PBCH). In particular, the system information on PBCH can include a master information block which conveys bandwidth information, PHICH configuration information, and/or a system frame number. Subsequently, UEs 120 and UE 130 can initiate random access procedures.

In addition to initial access described above, random access procedures can be initiated in a variety of situations. For example, UE 120 and/or UE 130 can have new uplink data or uplink control information but lack uplink synchronization. In another example, UEs 120 and/or 130 can have new downlink data to receive but lack uplink synchronization required to transmit corresponding acknowledgements/non-acknowledgements on the uplink. In yet more examples, UE 120 and UE 130 can employ random access procedures to conduct handovers or to recover from a radio link failure.

Random access procedures can be contention-based or contention-free. In contention-based random access each UE randomly chooses a random access preamble. Accordingly, a possibility exists that more than one UE simultaneously transmit identical preambles. In such situations, a base station receiving the identical preambles carries out a contention resolution process. With contention-free random access, which can be used in situations where a UE has new downlink data and/or engaged in a handover, the base station can allocate a dedicated preamble to the UE to avoid any contention.

Typically, contention-based random access includes four steps. In the first step, a UE (e.g., UE 120 or UE 130) transmits a random access preamble in accordance with a pre-configured structure or format. The UE randomly selects one preamble from a plurality of preambles to transmit. In one example, the plurality of preambles can include 64 preambles; however, it is to be appreciated that a lesser or greater number of preambles can be available for selection by the UE. The preamble is transmitted on a physical random access channel (PRACH), which is a set of time-frequency resources allocated for random access preamble transmissions. The set of time-frequency resources can be indicated in a system information block.

In response to the random access preamble transmission, a base station (e.g., eNB 110) transmits a message on a downlink channel, such as a physical downlink shared channel (PDSCH). The message can include an index of the random access preamble the base station detected, a timing correction, a scheduling grant that indicates uplink resources for a third step of the random access procedure, and a temporary identifier such as a temporary cell-radio network temporary identifier (C-RNTI).

The UE, when it obtains the messages, compares the index of the preamble detected by the base station to preamble transmitted by the UE. If a match occurs, the UE transmits a terminal identification message in the third step of contention-based random access. The message can include a connection request, tracking area update information, scheduling request, and/or an identity of the UE. The identity can be an already assigned C-RNTI (e.g., UE is connected but lost uplink synchronization) or a core network terminal identifier (e.g., UE is performing an initial access). In a final step of contention-based random access, the base station transmits a contention resolution message. The contention resolution message echoes a terminal identity received in the third step. The UE, upon reception of the contention resolution message, compares the included identity with the identity transmitted in step three. Random access is deemed successful if a match is observed.

Contention-free random access can include three steps. In a first step, a base station assigns a dedicated preamble to a UE. The UE employs the assigned preamble to transmit a random access preamble message to the base station. The base station responds with a random access response message.

Figure 2:
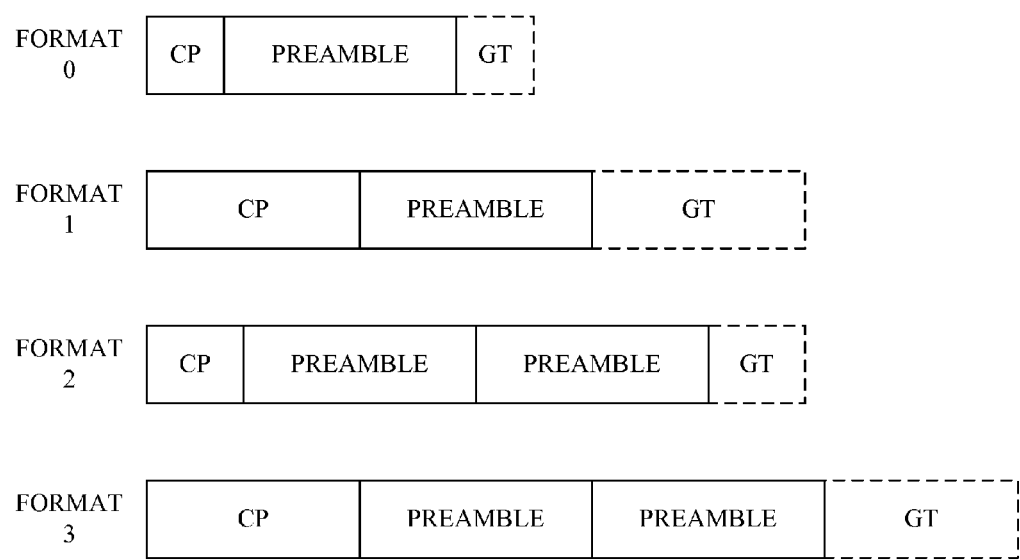
FIG. 2 is an illustration of example preamble formats in accordance with various aspects.

As discussed above, UEs typically transmit a random access preamble in accordance with a pre-configured structure or format. For example, for FDD operation, the preamble format can be one of a set of four formats and, for TDD operation, the format can be one of a set of five formats. Turning briefly to FIG. 2, example preamble formats are depicted. It is to be appreciated that claimed subject matter is not limited to the example preamble formats illustrated in FIG. 2 as it is contemplated that alternative structures, with varying sizes in the frequency and/or time dimension, varying content, varying sizes of constituent pieces, etc., are intended to fall within the scope of the hereto appended claims.

Four formats, formats 0 through 1 are depicted in FIG. 2. The formats can be distinguished by a duration of a cyclic prefix (CP) and/or a duration of a preamble sequence. A guard time (GT) associated with each format is included and determined to be a sufficient duration to extend the format to a whole number of milliseconds. For example, in format 0, the cyclic prefix can be 0.1 ms and the preamble sequence can be 0.8 ms in duration. Accordingly, the guard time can be 0.1 ms in duration such that the overall duration of format 0 is 1 ms. In another example, format 1 can include a cyclic prefix with a 0.68 ms duration, a preamble sequence of 0.8 ms, and a guard time of 0.52 ms to result in an overall length of 2 ms. Format 2 can include a 0.2 ms cyclic prefix, a 1.6 ms preamble sequence, and a 0.2 ms guard time for an overall duration of 2 ms. Format 3 can include a 0.68 cyclic prefix, a 1.6 ms preamble sequence and a 0.72 ms guard time for an overall duration of 3 ms. An additional format, format 4 (not shown), can be employed in TDD operations. In format 4, the preamble is included in UpPTS.

In an aspect, each format is designed to accommodate cells with varying sizes. Typically, a larger cell introduces a large timing uncertainty as a location of a UE (e.g., near cell edge, near base station, etc.) is unknown and, accordingly, a propagation delay is unknown. Conventionally, with larger cells, longer formats with larger cyclic prefixes and guard times are employed to provide a sufficient window to enable distant users to transmit a preamble message without interfering with subsequent subframes not dedicated for random access. In another aspect, large cells can introduce greater pathloss such that longer preamble sequences are employed to provide sufficient energy at a detector (e.g., a base station).

In conventional LTE-based systems, a single format is employed throughout a cell. The format is selected based at least in part on a size of the cell, where larger cells employ longer formats and/or formats with longer cyclic prefixes and/or guard times. The format is specified in a system information block. For example, a parameter, prach-ConfigIndex, can be included in the system information block to indicate an index of the appropriate format (e.g., index 0 corresponds to format 0, and so on). Accordingly, the format, and hence the random access overhead, is dictated by a cell size in order to provide for a worst case scenario of a UE at the cell edge.

As depicted in FIG. 1, different UEs can be at different distances from a base station within a cell. For example, UE 120 can be at a first distance, d1, from eNB 110 and UE 130 can be at a second distance, d2, from eNB 110, wherein d2 is greater than d1. In an example, UE 120 can be near eNB 110 while UE 130 is located near the cell edge. Since, in a conventional system, a single format is configured for the cell, UE 120 employs a preamble format intended for cell edge users, which introduces additional overhead for UE 120.

In an aspect, multiple random access formats can be configured for a cell and dynamically selected by UEs within the cell. UEs, such as UE 120, close to eNB 110 can select a format designed for smaller cells (e.g., shorter cyclic prefix, shorter guard time, shorter overall duration) while UEs, such as UE 130, far away from eNB 110 can select a format designed for larger cells (e.g., longer cyclic prefix, longer guard time, longer overall duration). To avoid interference between disparate formats, each format index can be configured with disparate time-frequency resources and specified in a system information block.

Figure 3:
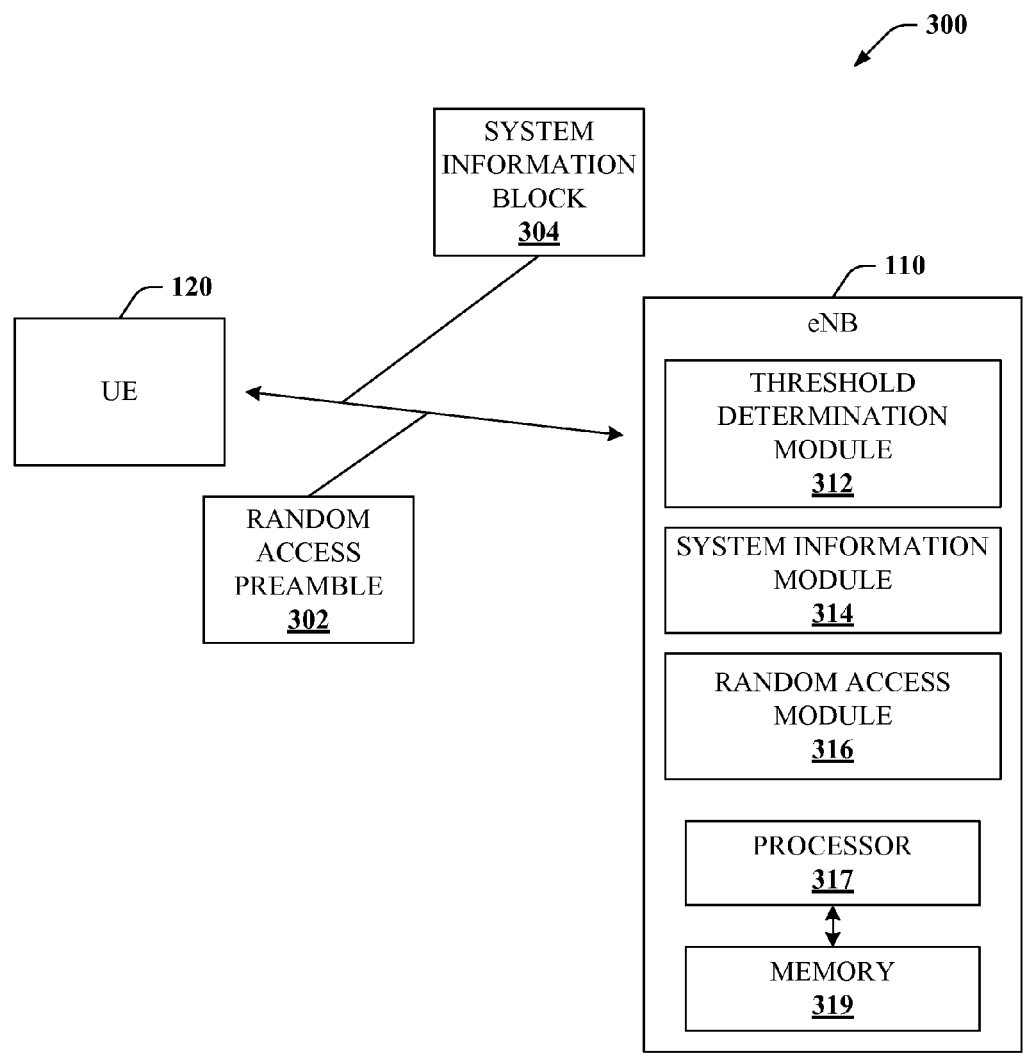
FIG. 3 is an illustration of an example system that facilitates enabling dynamic random access configuration on per-UE basis according to various aspects.

Turning to FIG. 3, illustrated is a system 300 that facilitates dynamic selection of a random access configuration in accordance with various aspects. System 300 can include eNB 110 and UE 120 as described with respect to previous figures. UE 120 can be configured to communicate with eNB 110 via downlink channels and uplink channels.

In an aspect, UE 120 can initiate random access procedures by transmitting random access preamble 302 to eNB 110. UE 120 can initiate random access procedures to initially access eNB 110, reacquire uplink synchronization, perform a handover, or recover from a radio link failure. The preamble sequence is randomly selected from a set of preamble sequences. The random access preamble message 302 is transmitted on resources specified in a system information block 304 broadcasted by eNB 110. In addition, the format of random access preamble 302 is based at least in part on information supplied in the system information block 304.

More particularly, the system information block 304 can specify a plurality of random access configuration or format indexes. Each index can be associated with one or more thresholds relative to a link quality metric. In a simplified example, consider a set of available configurations that includes two preamble formats. System information block 304 can include a single threshold value. The threshold value can relate to pathloss, propagation delay, distance from eNB 110, or some other similar metric. When a measurement by UE 120 is below the threshold, UE 120 selects a first format of the two preamble formats to employ when transmitting random access preamble 302. When the measurement is above the threshold, UE 120 utilizes the other preamble format. Consider a threshold that relates to pathloss. When a measured pathloss is below the threshold, channel conditions are sufficient enough and/or UE 130 is near enough to eNB 110 to justify employing a preamble format that reduces overhead (e.g., a format having a shorter duration, cyclic prefix, and/or guard time). However, when the measured pathloss exceeds the threshold, channels conditions and/or distance from the eNB 110 is such that a more overhead intensive format (e.g., a format having a longer duration, cyclic prefix, and/or guard time) is recommended. Generalizing to a system in which the set of available configurations includes more than two preamble formats, each format can be associated with at least one threshold. For instance, a first format can be employed when the measurement is below a first threshold, a second format can be utilized when the measurement is above the first threshold but below a second threshold, and so on.

eNB 110 can include a threshold determination module 312 that ascertains one or more thresholds to be included in system information block 304. The threshold determination module 312 provides a set of thresholds, wherein the number of threshold in the set is based upon the number of available formats. In one example, the number of thresholds is one less than the number of available formats. In an aspect, the threshold determination module 312 can leverage a pathloss model with corresponding timing delay to establish the set of thresholds. Propagation delay (e.g., a time required for an electromagnetic wave to traverse a distance between transmitter and receiver) is directly related to the distance between the transmitter and the receiver. Distance is further directly related to pathloss. Accordingly, a relationship exists between distance, propagation delay, and pathloss. Different random access preamble formats are good for different propagation delays. For example, a nearby user with a small propagation delay can employ a format having a shorter duration, cyclic prefix, and/or guard time. However, a faraway user with a large propagation delay is best served with a format having a longer duration, cyclic prefix, and/or guard time in order to account for increased uncertainty in timing. Accordingly, threshold determination module 312 can establish thresholds at boundary points below which a first format provides superior performance and above which a second format provides better performance. The thresholds can be adjusted over time to account for changes in the environment around eNB 110, changes in channel conditions within the cell served by eNB 110, etc.

eNB 110 can further include a system information module 314 that generates the system information block 304. The system information module 314 incorporates the set of thresholds into the system information block 304. In addition, the system information module 314 can assign disparate time slots (e.g., different time-frequency resources) for random access preambles utilizing different formats. For instance, each format can be assigned a unique time slot to avoid collisions between formats.

In addition, eNB 110 can include a random access module 316 configured to conduct random access procedures. For instance, random access module 316 can facilitate detection of random access preamble 302 and/or other preambles transmitted by other UEs (not shown). In one aspect, based upon a schedule of time slots determined for each available preamble formats, the random access module 316 can be configured to detect a particular preamble format during a particular random access transmission instance. In this manner, random access module 316 avoids blindly detecting random access formats in addition to the preambles themselves. However, it is to be appreciated that random access module 316 can perform such blind detection and that the claimed subject matter is contemplated to cover such features. In another aspect, random access module 316 can generate and transmit random access response messages (e.g., step 2 messages), detect and analyze terminal identity messages (e.g., step 3 messages), and/or generate and transmit contention resolution messages.

As further illustrated in system 300, eNB 110 can include a processor 317 and/or a memory 319, which can be utilized to implement some or all the functionality of threshold determination module 312, system information module 314, random access module 316, and/or other functionality or module of eNB 110 described herein.

Figure 4:
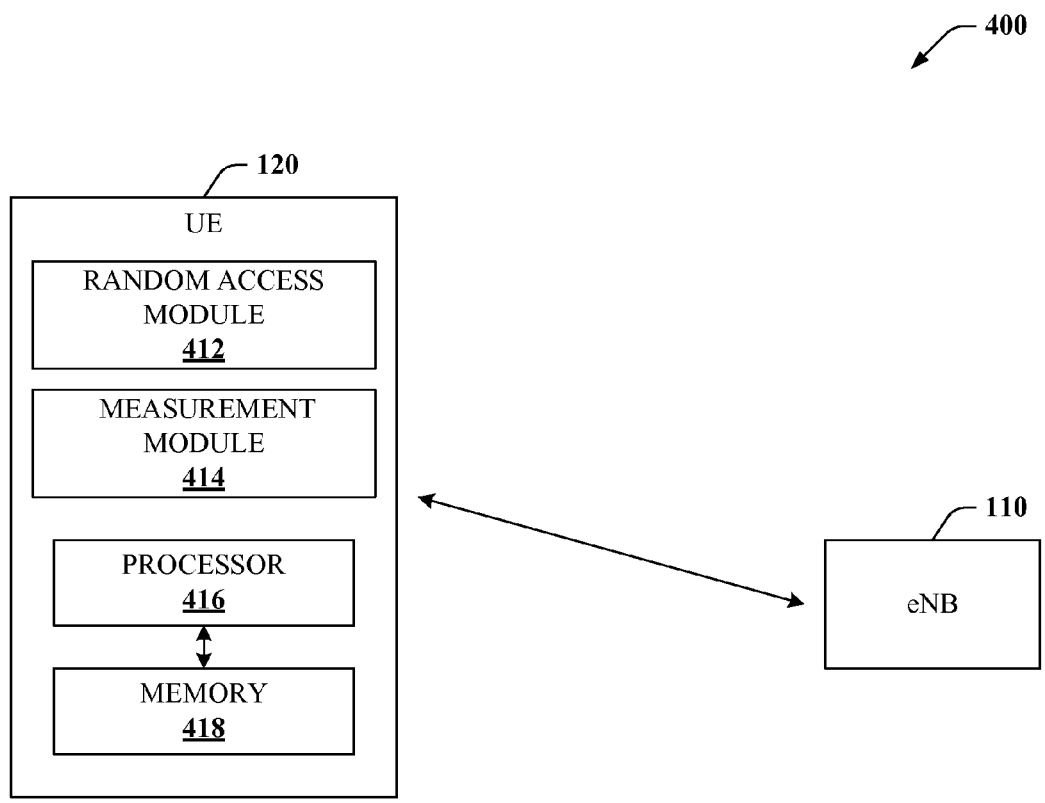
FIG. 4 illustrates an example system that facilitates dynamic selection of a random access configuration in accordance with various aspects.

Turning to FIG. 4, a system 400 is illustrated which facilitates dynamic selection of a random access configuration in accordance with various aspects. System 400 can include eNB 110 and UE 120 as described with respect to previous figures. UE 120 can include a random access module 412 configured to conduct random access procedures and a measurement module 414 configured to generate measurements of at least one value associated with a radio link between UE 120 and eNB 110.

Random access module 412 can randomly select a preamble sequence from a group of sequences to transmit as part of a random access preamble. In addition, the random access module 412 can dynamically select a random access channel format or configuration to employ when transmitting the preamble. In one example, random access module 412 can select a format based upon a comparison to at least one threshold included in a system information block broadcasted by eNB 110. The measurement module 414 can evaluate a value for a characteristic of the radio link between eNB 110 and UE 120. For instance, the measurement module 414 can estimate pathloss, propagation delay, and/or a distance between eNB 110 and UE 120. Random access module 412 can compare the measured value to the at least one threshold to select an appropriate format to employ when transmitting the preamble. In another aspect, random access module 412 can generate and transmit the preamble in accordance with the selected format and during a random access time slot associated with the selected format.

As further illustrated in system 400, UE 120 can include a processor 416 and/or a memory 418, which can be utilized to implement some or all the functionality of random access module 412, measurement module 414, and/or other functionality or module of UE 120 described herein.

Figure 5:
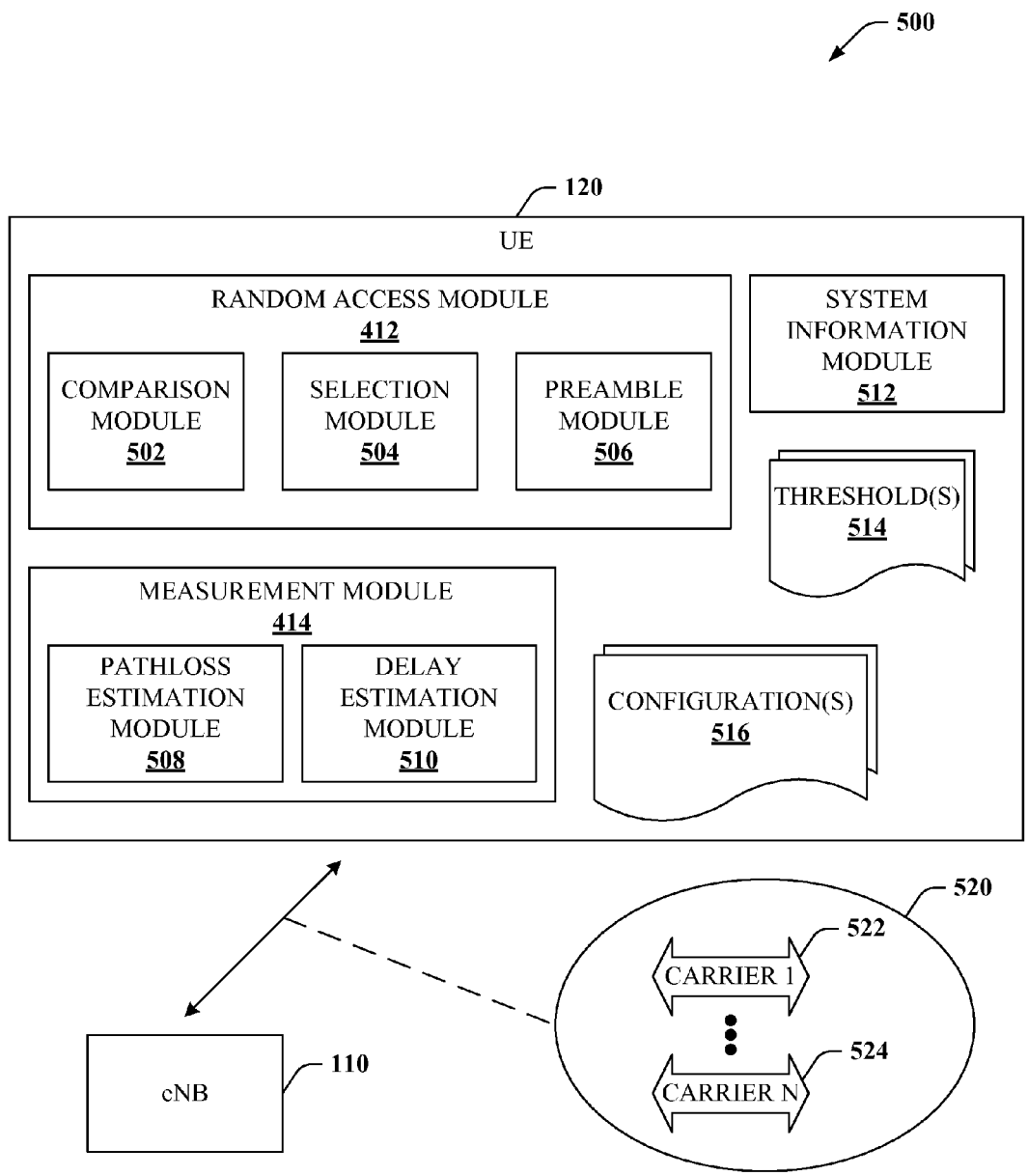
FIG. 5 illustrates an example system that facilitates dynamic selection of a random access configuration in accordance with various aspects.

FIG. 5 depicts a system 500 that facilitates dynamic selection of a random access configuration in accordance with various aspects. As described supra, eNB 110 can broadcast one or more system information blocks that include information relevant for random access. For example, the one or more system information blocks can specify information or parameters such as, but not limited to, available PRACH configurations (e.g., preamble formats), threshold values, random access resources (e.g., on a per format basis or in aggregate), and the like. A system information module 512 of UE 120 can evaluate the one or more system information blocks to facilitate configuration of random access module 412 to implement random access procedures. The system information module 512 can extract information from the one or more system information blocks to generate a set of thresholds 514 and/or a set of configurations 516. In an aspect, memory 418 of UE 120 stores the set of thresholds 514 and the set of configurations 516.

The set of configurations 516 can include random access channel (PRACH) formats or configuration available to UE 120 and/or supported by eNB 110. The set of configurations 516 can include all available formats, such as example formats described above with reference to FIG. 2, or a subset of all available formats. For example, eNB 110 can serve a cell having a small size such that formats having longer durations, cyclic prefixes, and/or guard times introduce additional overhead without significant benefits. Accordingly, the set of configurations 516 can exclude such formats. In another example, eNB 110 can serve a large cell (e.g., a cell having a maximum cell size), in which case all formats can be available to allow UEs to select an appropriate format up to a worst case scenario.

The set of thresholds 514 can include one or more threshold values employable to facilitate selection of a preamble format. In one aspect, the set of thresholds 514 can include a number of thresholds that is one less than a number of formats included in the set of configurations 516. Thresholds in the set of thresholds 514 can be relative to a characteristic of the radio link between UE 120 and eNB 110. For example, the thresholds can be path loss values, propagation delay values, distance values, etc.

Measurement module 414 of UE 120 can measure or estimate values of link characteristics such as distance, delay, path loss, or the like. Measurement module 414 can include a pathloss estimation module 508 configured to measure or estimate path loss associated with the radio link between eNB 110 and UE 120. In addition, pathloss estimation module 508 can estimate pathloss from a distance measure and/or a propagation delay measure. Measurement module 414 can further include a delay estimation module 510 configured to measure or estimate a propagation delays associated with the radio link. Delay estimation module 510 can further estimate propagation delay from distance measurements and/or pathloss measurements.

Measurement module 414 provides a measurement value to random access module 412 to facilitate dynamic selection of a random access channel format. As discussed above, the measurement value can be a distance value, a pathloss value, a propagation delay value, or the like. The measurement value can be in similar terms as the values included in the set of thresholds 514 or different terms. For instance, random access module 412 can convert or otherwise relate the measurement value to facilitate evaluation of the radio link with respect to the set of thresholds 514.

Random access module 412 can include a comparison module 502 that evaluates the measurement value relative to the set of thresholds 514. In one aspect, the comparison module 502 identifies where the measurement values falls when the thresholds in the set of thresholds 514 are ordered. A selection module 504 selects a channel format from the set of configurations 516 based upon where the measurement value resides relative to the set of thresholds 514. For example, when the measurement value is below a lowest threshold of the set of thresholds 514, selection module 504 can choose a first configuration. When the measurement value is above the lowest threshold but below the next highest threshold, the selection module 504 selects a second configuration, and so on. The relationship between the measurement value and which configuration is selected depends on the characteristic represented by the threshold values. For instance, when the set of thresholds 514 includes pathloss thresholds, falling below the lowest threshold can suggest that a configuration having a short duration, cyclic prefix, and/or guard period can be selected. When the measurement value is between the lowest threshold and the next highest threshold, selection module 504 can choose a configuration having a relatively larger duration, cyclic prefix, and/or guard period, and so on. Preamble module 506 can randomly select a preamble sequence and generate a random access preamble message, wherein generating the random access preamble message is in accordance with the selected configuration.

In accordance with another aspect, eNB 110 and UE 120 can be configured to employ multiple component carriers. For example, eNB 110 and UE 120 can communicate via a set of component carriers 520, which includes carrier-1 522 through carrier-N 524, where N is an integer greater than or equal to one. While two carriers are depicted in FIG. 5, it is to be appreciated that eNB 110 and UE 120 can be configured to operate with a single carrier, two carriers, three carriers, and so on, up to a maximum number of component carriers available to system 500. Each carrier in the set of carriers 520 can encapsulate a complete radio interface. For instance, each carrier in the set of carriers 520 can respectively include an LTE or LTE-A radio interface, such that the set of carriers 520 respectively include a plurality of downlink and uplink logical, transport, and physical channels, such as, but not limited to, a physical downlink shared channel (PDSCH), a physical downlink control channel (PDCCH), a physical uplink shared channel (PUSCH), a physical uplink control channel (PUCCH), a physical broadcast channel (PBCH), and the like. Thus, UE 120 can obtain complete wireless communication services via one carrier in the set of carriers 520. In addition, greater data rates can be achieved through utilization of two or more carriers in the set of carriers 520. In one example, the set of component carriers 520 can be an aggregation of LTE Release 8 carriers (or carriers of another wireless communication system), wherein a legacy UE can utilize a single component carrier, while an advanced UE can employ one or more component carriers. While LTE or LTE-A component carriers and channels are described above, it is to be appreciated that the attached claims are not limited to such systems and that the set of carriers 520 can be WCDMA carriers, HSPA carriers, CDMA 2000 carriers, etc.

Each carrier in the set of carriers 520 can have a different coverage and/or a different pathloss. eNB 110 can broadcast system information blocks on each carrier in the set of carriers 520 to provide available random access channel configurations and/or threshold values unique to each carrier. In another aspect, carriers in the set of carriers 520 can be grouped according to similarities and each group is associated with different available configurations and/or thresholds. UE 120 can separately manage sets of configuration and sets of thresholds for each carrier and/or group of carriers in the set of carriers 520. In addition, UE 120 can monitor each carrier or group of carriers to evaluate a measurement value that facilitates selection of an appropriate channel configuration. UE 120 can select a configuration based upon a measurement value, set of thresholds, and set of available configurations associated with a component carrier in the set of carriers 520 on which random access is conducted.

Figure 6:
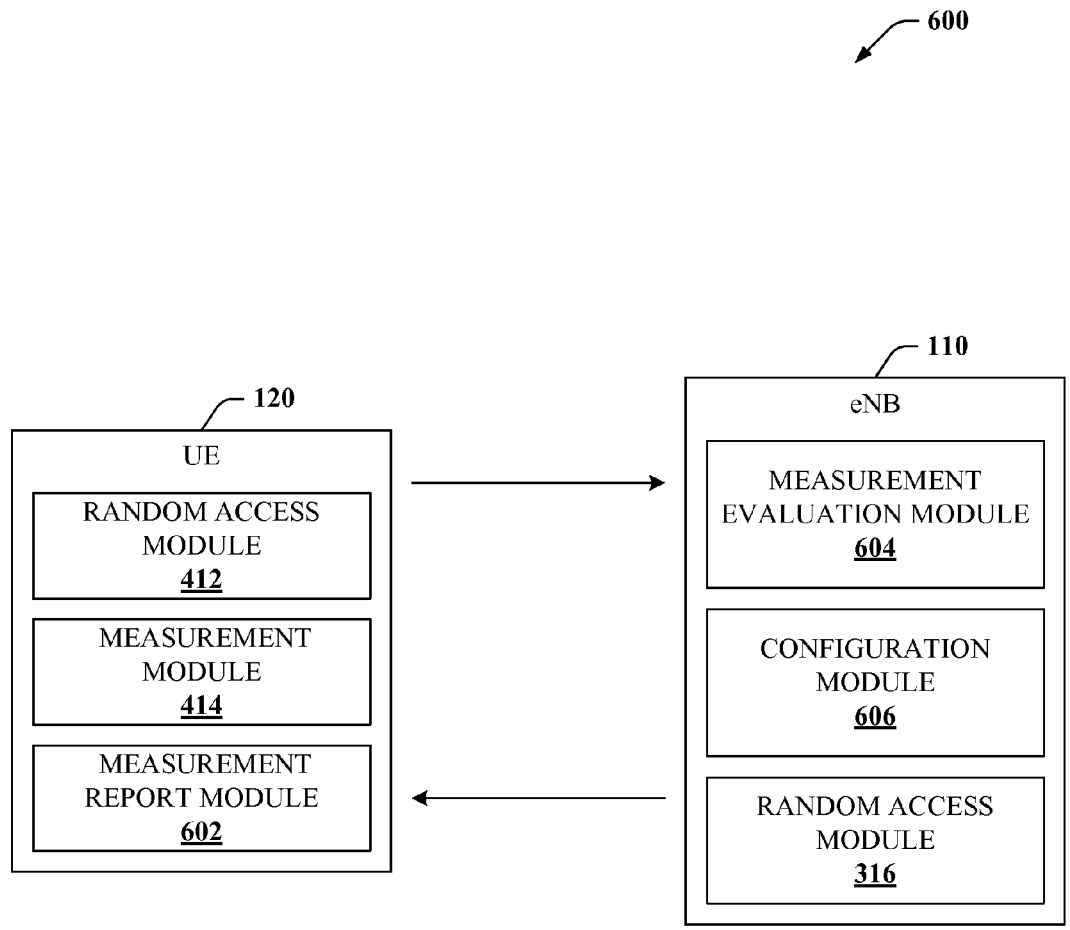
FIG. 6 is an illustration of an example system that facilitates dynamic random access configuration for contention-free random access in accordance with various aspects.

FIG. 6 depicts a system 600 that facilitates dynamic random access configuration for contention-free random access in accordance with various aspects. System 600 can include UE 120, eNB 110, random access module 316, random access module 412, and measurement module 414, which can be substantially similar to and perform similar functionality as similarly numbered components described above with reference to previous figures. In contention-free random access, typically, UE 120 is provided an explicit preamble sequence and an explicit mask index, which are conditioned on the single configuration index broadcasted throughout a cell served by eNB 110. To support dynamic configuration selection that provides efficient performance while reducing overhead, UE 120 can include a measurement report module 602 that generates a measurement report to transmit to eNB 110. The measurement report can include the measurement value generated by the measurement module 414. For example, the measurement value can be a pathloss measurement and the measurement report can be a pathloss report. eNB 110 can include a measurement evaluation module 604 that analyzes the report and a configuration module 606 that selects a configuration based upon the report. eNB 110 can signal to UE 120 an index associated with the selected configuration.

Referring to FIGS. 7-11, methodologies are described related to facilitating dynamic selection of a random access channel. The methodologies can be implemented by systems 100, 300, 400, 500 and/or 600, described above. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 7:
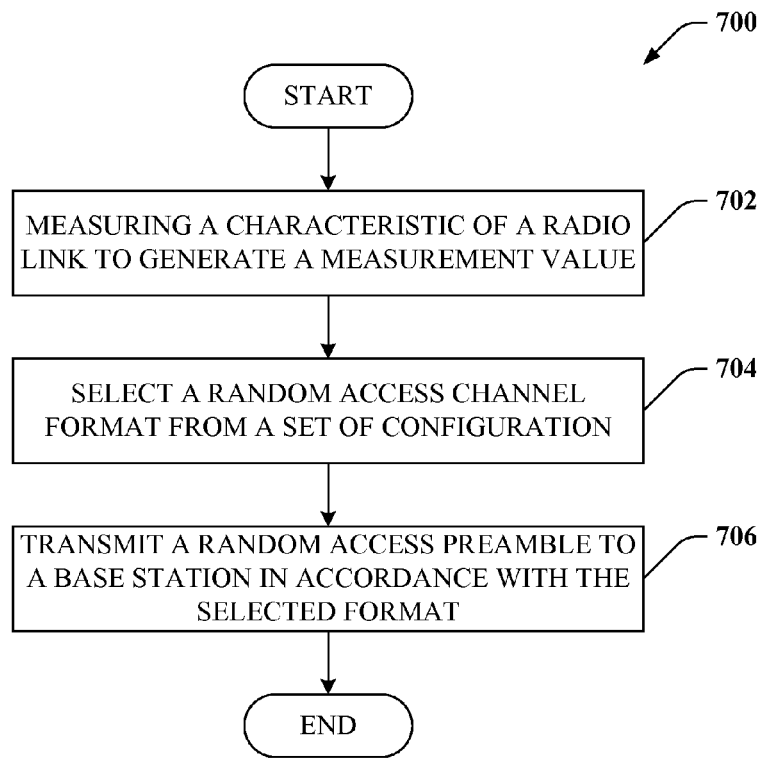
FIG. 7 is an illustration of an example methodology for dynamically selecting a random access channel configuration.

Turning to FIG. 7, illustrated is a method 700 for dynamically selecting a random access channel configuration. Method 700 can be employed, for example, by a user equipment (e.g., UE 120 or 130) to select an optimal configuration for random access. At reference numeral 702, a characteristic of a radio link can be measured to generate a measurement value. Measuring the characteristic can include estimating at least one of pathloss, propagation delay, or distance. At reference numeral 704, a random access channel format can be selected from a set of configurations. In one example, the random access channel format can include a short cyclic prefix, a short guard time, and a short duration. In another example, the random access channel format can include a long cyclic prefix, a short guard time, and a short duration. In yet another example, the random access channel format can have a long cyclic prefix, a long guard time, and a short duration. In still another example, the random access channel can include a long cyclic prefix, a long guard time, and a long duration. In addition, the selected random access channel format can include a short cyclic prefix, a short guard time, and a long duration.

At reference numeral 706, a random access preamble can be transmitted to a base station in accordance with the selected format. The random access preamble can be constructed based upon the selected format and transmitted on a set of resources uniquely associated with the selected format.

Figure 8:
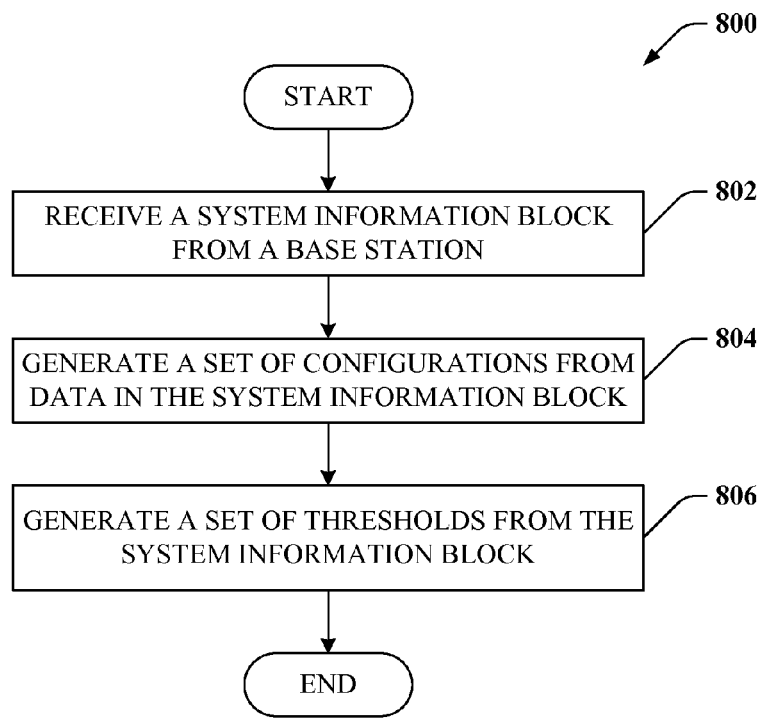
FIG. 8 is an illustration of an example methodology for evaluating system information to facilitate dynamic random access channel configuration in accordance with various aspects.

Referring now to FIG. 8, a method 800 for evaluating system information to facilitate dynamic random access channel configuration is illustrated. At reference numeral 802, a system information block, transmitted by a base station, is received. In an aspect, the system information block can specify available random access channel configurations, threshold values, resources allocated for random access preamble transmissions, etc. At reference numeral 804, a set of configurations is generated from the available random access channel configurations in the system information block. At reference numeral 806, a set of thresholds is generated from the threshold values included in the system information block.

Figure 9:
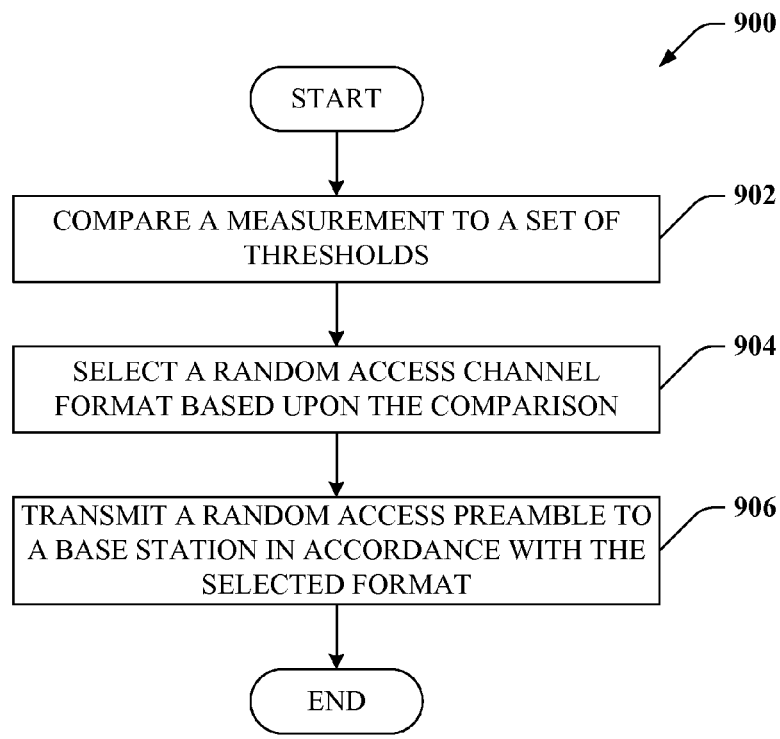
FIG. 9 is an illustration of an example methodology for dynamically selecting a channel format based upon at least one threshold.

FIG. 9 illustrates a method 900 for dynamically selecting a channel format based upon at least one threshold. At reference numeral 902, a measurement is compared to a set of thresholds. Comparing the measurement to the set of thresholds can include identifying a placement of the measurement within an ordered list of thresholds from the set of thresholds. At reference numeral 904, a random access channel format is selected based upon the comparison. In one example, a first random access channel format can be selected when the measurement is below a first threshold of the set of thresholds and a second random access channel format can be selected when the measurement exceeds the first threshold. It is to be appreciated that the above comparison and selection scheme can be extended to a plurality of thresholds and a plurality of formats. At reference numeral 906, a random access preamble, in accordance with the selected format, can be transmitted to a base station.

Figure 10:
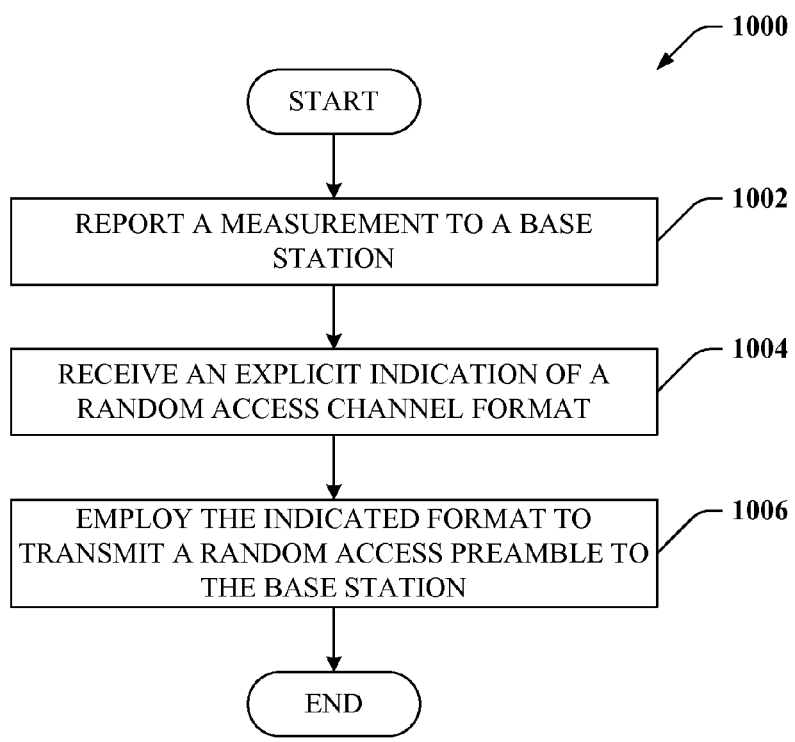
FIG. 10 is an illustration of an example methodology for dynamically selecting a random access channel format for contention-free random access procedure.

FIG. 10 illustrates a method 1000 for dynamically selecting a random access channel format for contention-free random access procedure. At reference numeral 1002, a measurement is reported to a base station. At reference numeral 1004, an explicit indication of a random access channel format is received. At reference numeral 1006, the indicated format is employed to transmit a random access preamble to the base station.

Figure 11:
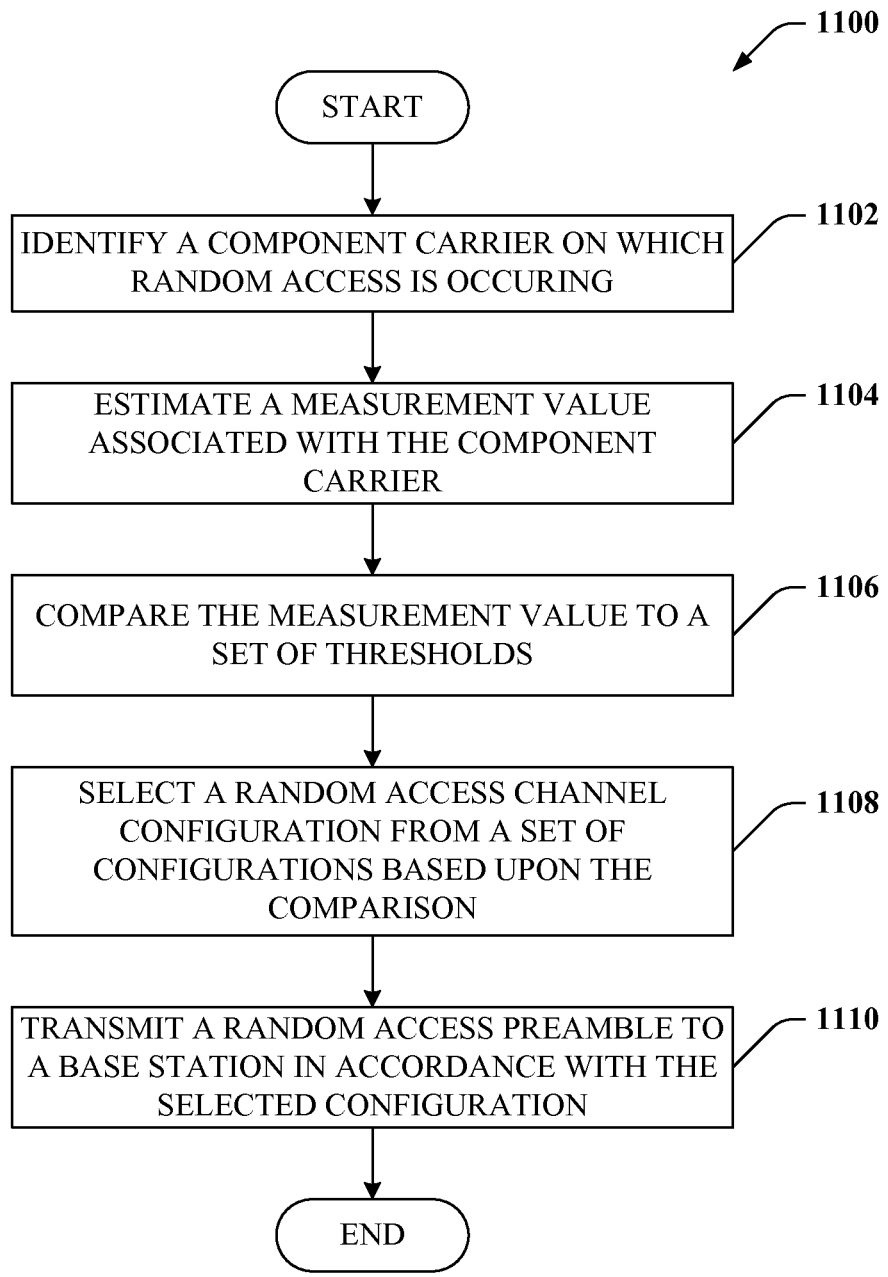
FIG. 11 is an illustration of an example methodology for dynamically selecting a random access channel format in a multi-carrier system.

FIG. 11 illustrates a method 1100 for dynamically selecting a random access channel format in a multi-carrier system. At reference numeral 1102, a component carrier on which random access is occurring is identified. At reference numeral 1104, a measurement value is estimated, wherein the measurement value is associated with the component carrier identified. At reference numeral 1106, the measurement value can be compared to a set of thresholds. At reference numeral 1108, a random access channel configuration is selected from a set of configurations based upon the comparison. In an aspect, the set of configurations and the set of thresholds are unique to the component carrier identified. At reference numeral 1110, a random access preamble is transmitted to a base station in accordance with the selected configuration.

It will be appreciated that, in accordance with one or more aspects described herein, inferences can be made regarding estimating characteristics of a radio link, determining thresholds, selecting configurations, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
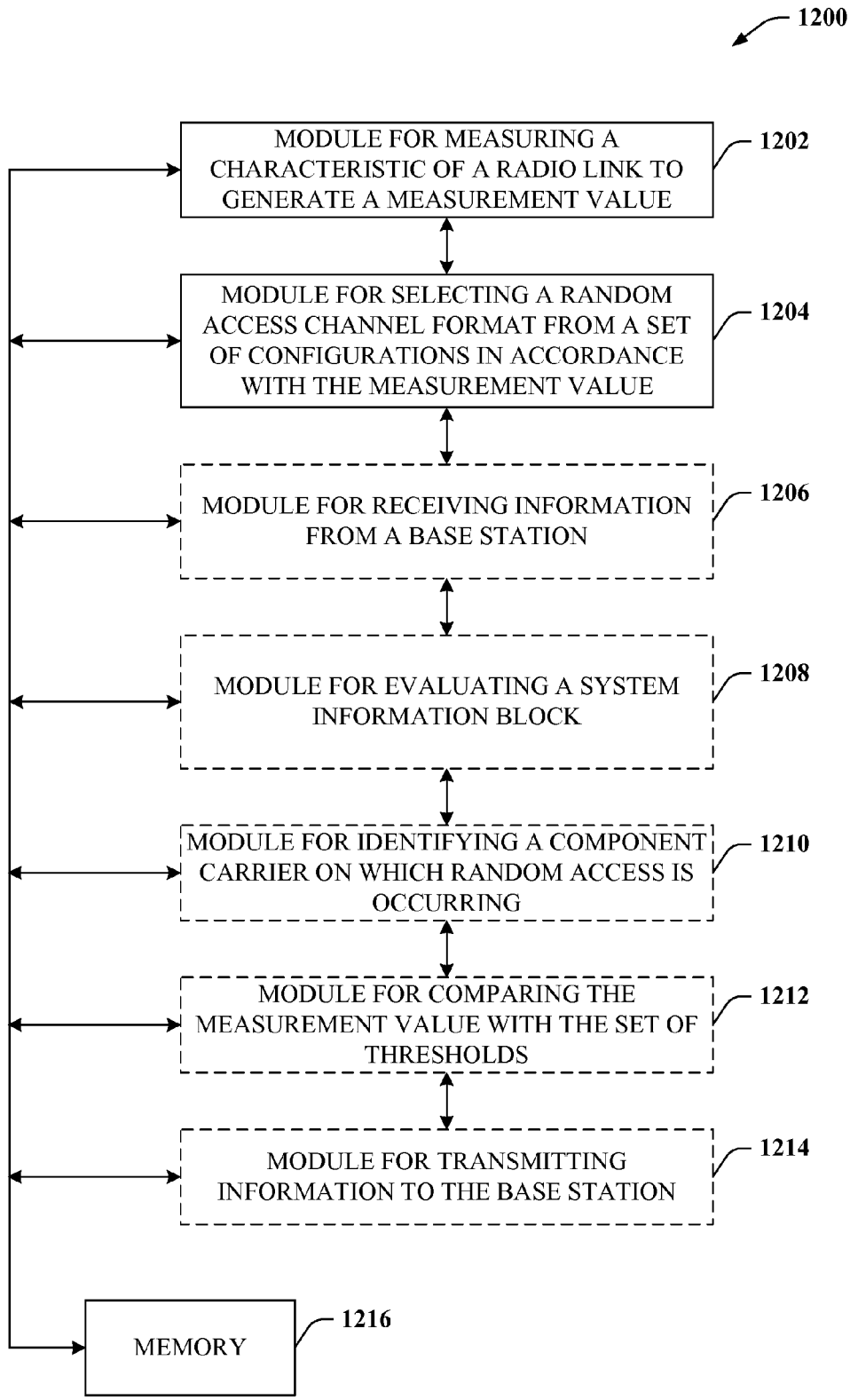
FIG. 12 is an illustration of an example apparatus that facilitates dynamic selection of a random access channel configuration in accordance with various aspects.

Referring next to FIG. 12, an apparatus 1200 that facilitates dynamic selection of a random access channel configuration is illustrated. It is to be appreciated that apparatus 1200 is represented as including functional blocks, which can be functional blocks that represent functions implemented by a processor, software, or combination thereof (e.g., firmware). Apparatus 1200 can be implemented by a mobile device (e.g., UE 120 or UE 130) and/or any other suitable network entity. Apparatus 1200 can include a module 1202 for measuring a characteristic of a radio link to generate a measurement value, and a module 1204 for selecting a random access channel format from a set of configurations in accordance with the measurement value. Further, apparatus 1200 can include an optional module 1206 for receiving information from a base station, an optional module 1208 for evaluating a system information block, an optional module 1210 for identifying a component carrier on which random access is occurring, an optional module 1212 for comparing the measurement value with the set of thresholds, and an optional module 1214 for transmitting information to the base station. Additionally, apparatus 1200 can include a memory 1216 that retains instructions for executing functions associated with modules 1202-1214.

Figure 13:
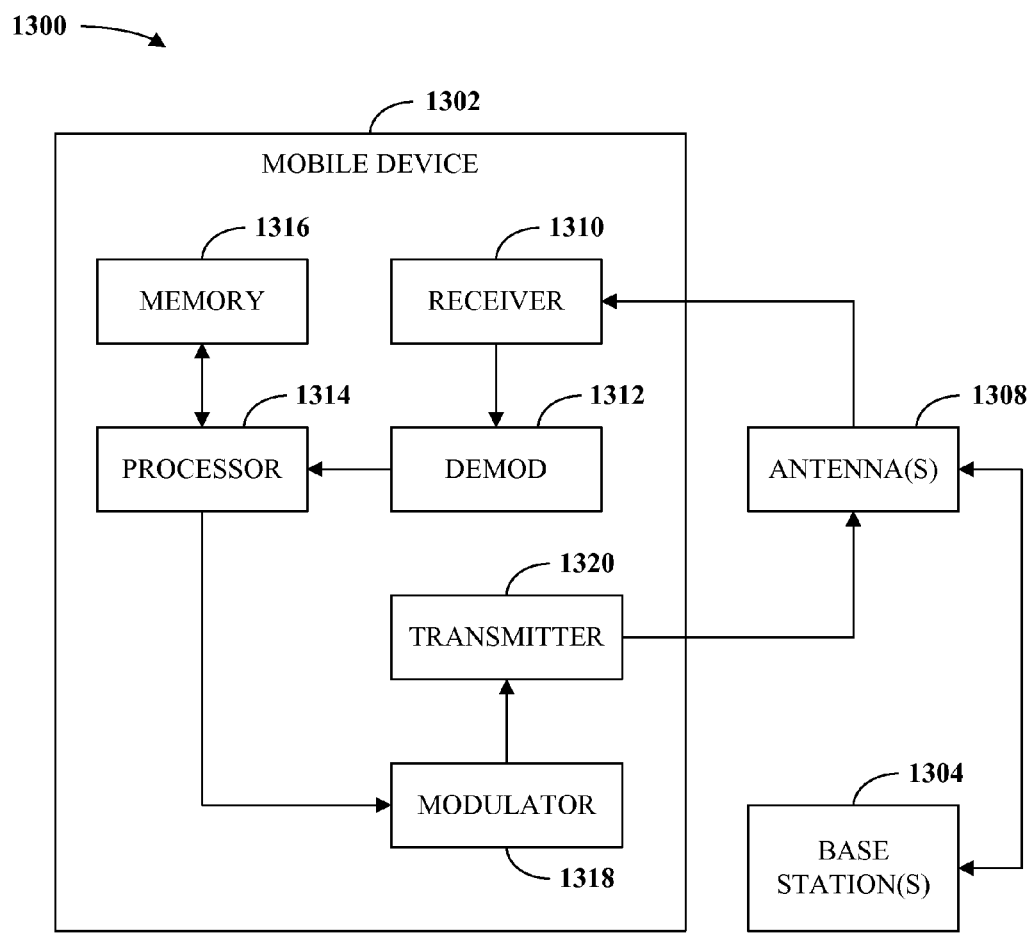
FIGS. 13-14 are block diagrams of respective wireless communication devices that can be utilized to implement various aspects of the functionality described herein.

FIG. 13 is a block diagram of another system 1300 that can be utilized to implement various aspects of the functionality described herein. In one example, system 1300 includes a mobile device 1302. As illustrated, mobile device 1302 can receive signal(s) from one or more base stations 1304 and transmit to the one or more base stations 1304 via one or more antennas 1308. Additionally, mobile device 1302 can comprise a receiver 1310 that receives information from antenna(s) 1308. In one example, receiver 1310 can be operatively associated with a demodulator (Demod) 1312 that demodulates received information. Demodulated symbols can then be analyzed by a processor 1314. Processor 1314 can be coupled to memory 1316, which can store data and/or program codes related to mobile device 1302. Mobile device 1302 can also include a modulator 1318 that can multiplex a signal for transmission by a transmitter 1320 through antenna(s) 1308.

Figure 14:
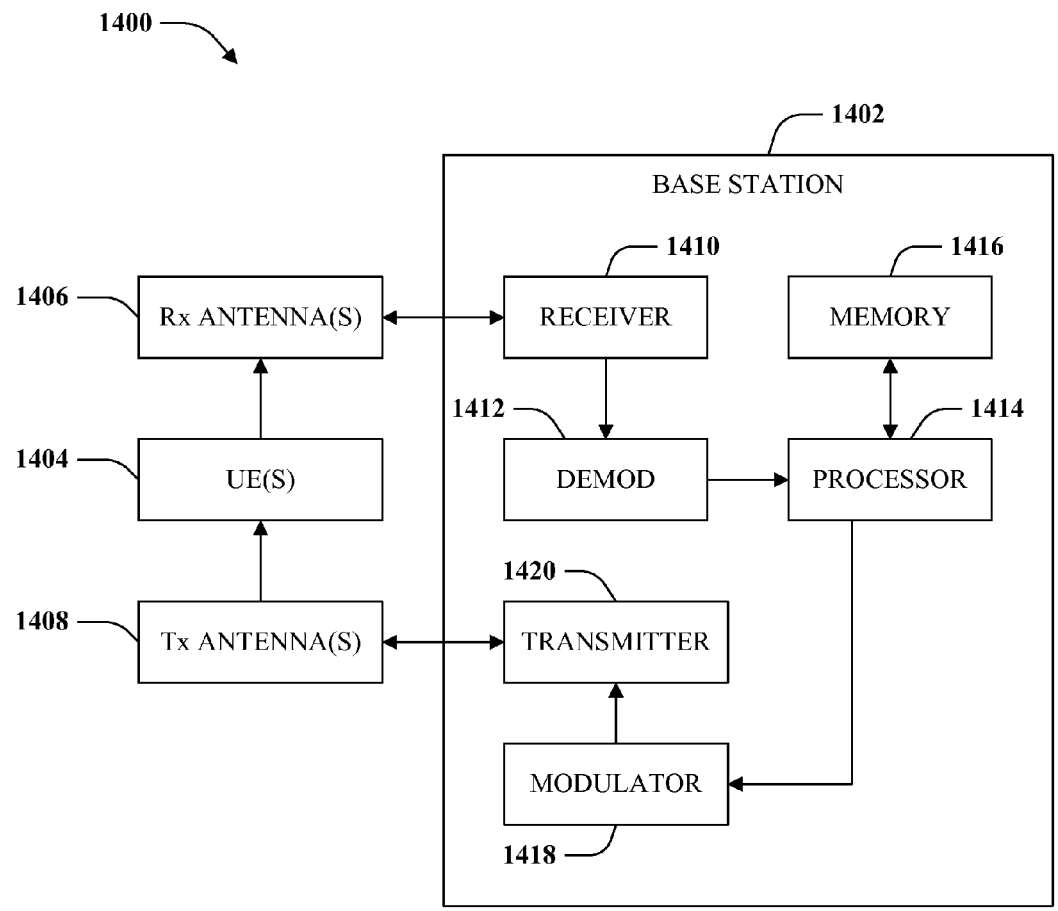

FIG. 14 is a block diagram of a system 1400 that can be utilized to implement various aspects of the functionality described herein. In one example, system 1400 includes a base station or base station 1402. As illustrated, base station 1402 can receive signal(s) from one or more UEs 1404 via one or more receive (Rx) antennas 1406 and transmit to the one or more UEs 1404 via one or more transmit (Tx) antennas 1408. Additionally, base station 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. Base station 1402 can also include a modulator 1418 that can multiplex a signal for transmission by a transmitter 1420 through transmit antenna(s) 1408.

Figure 15:
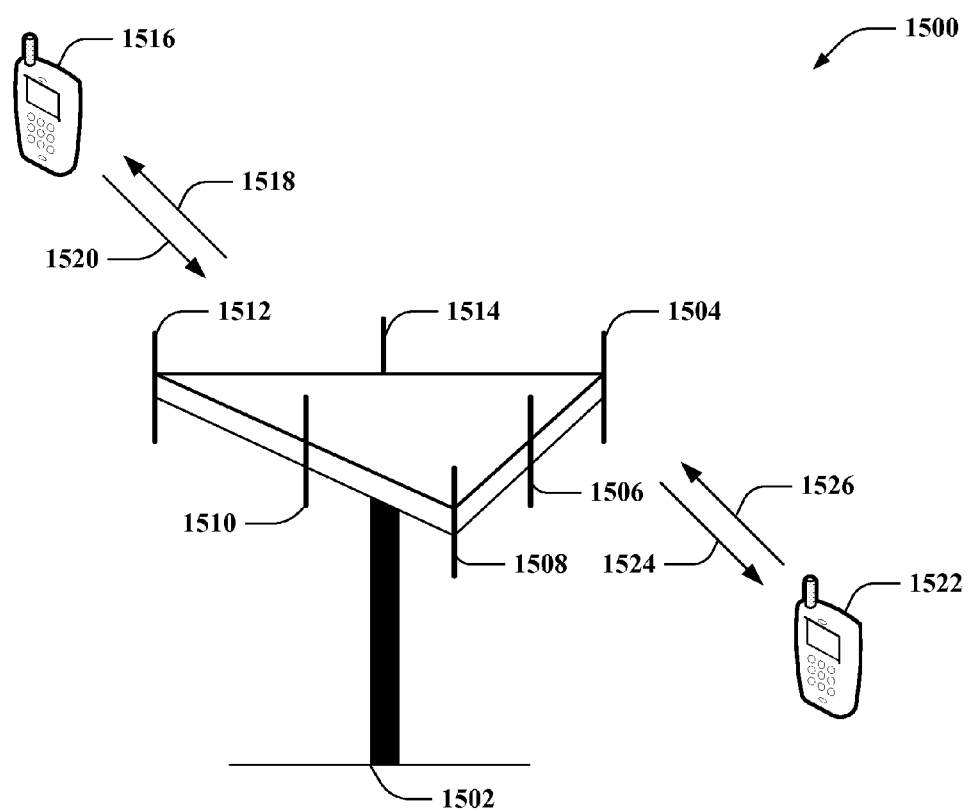
FIG. 15 is an illustration of a wireless communication system in accordance with various aspects set forth herein.

Referring now to FIG. 15, a wireless communication system 1500 is illustrated in accordance with various embodiments presented herein. System 1500 comprises a base station (e.g., access point) 1502 that can include multiple antenna groups. For example, one antenna group can include antennas 1504 and 1506, another group can comprise antennas 1508 and 1510, and an additional group can include antennas 1512 and 1514. Two antennas are illustrated for each antenna group; however, more or fewer antennas can be utilized for each group. Base station 1502 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1502 can communicate with one or more UEs such as UE 1516 and UE 1522; however, it is to be appreciated that base station 1502 can communicate with substantially any number of UEs similar to UEs 1516 and 1522. UEs 1516 and 1522 can be, for example, cellular phones, smart phones, laptops, handheld communication devices, handheld computing devices, satellite radios, global positioning systems, PDAs, and/or any other suitable device for communicating over wireless communication system 1500. As depicted, UE 1516 is in communication with antennas 1512 and 1514, where antennas 1512 and 1514 transmit information to UE 1516 over a downlink 1518 and receive information from UE 1516 over an uplink 1520. Moreover, UE 1522 is in communication with antennas 1504 and 1506, where antennas 1504 and 1506 transmit information to UE 1522 over a downlink 1524 and receive information from UE 1522 over an uplink 1526. In a frequency division duplex (FDD) system, downlink 1518 can utilize a different frequency band than that used by uplink 1520, and downlink 1524 can employ a different frequency band than that employed by uplink 1526, for example. Further, in a time division duplex (TDD) system, downlink 1518 and uplink 1520 can utilize a common frequency band and downlink 1524 and uplink 1526 can utilize a common frequency band.

Each group of antennas and/or the area in which they are designated to communicate can be referred to as a sector of base station 1502. For example, antenna groups can be designed to communicate to UEs in a sector of the areas covered by base station 1502. In communication over downlinks 1518 and 1524, the transmitting antennas of base station 1502 can utilize beamforming to improve signal-to-noise ratio of downlinks 1518 and 1524 for UEs 1516 and 1522. Also, while base station 1502 utilizes beamforming to transmit to UEs 1516 and 1522 scattered randomly through an associated coverage, UEs in neighboring cells can be subject to less interference as compared to a base station transmitting through a single antenna to all its UEs. Moreover, UEs 1516 and 1522 can communicate directly with one another using a peer-to-peer or ad hoc technology (not shown).

According to an example, system 1500 can be a multiple-input multiple-output (MIMO) communication system. Further, system 1500 can utilize substantially any type of duplexing technique to divide communication channels (e.g., downlink, uplink, etc.) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1502 can communicate to the UEs 1516 and 1522 over the channels, which can be created for various types of data. For example, channels can be created for communicating various types of general communication data, control data (e.g., quality information for other channels, acknowledgement indicators for data received over channels, interference information, reference signals, etc.), and/or the like.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 16:
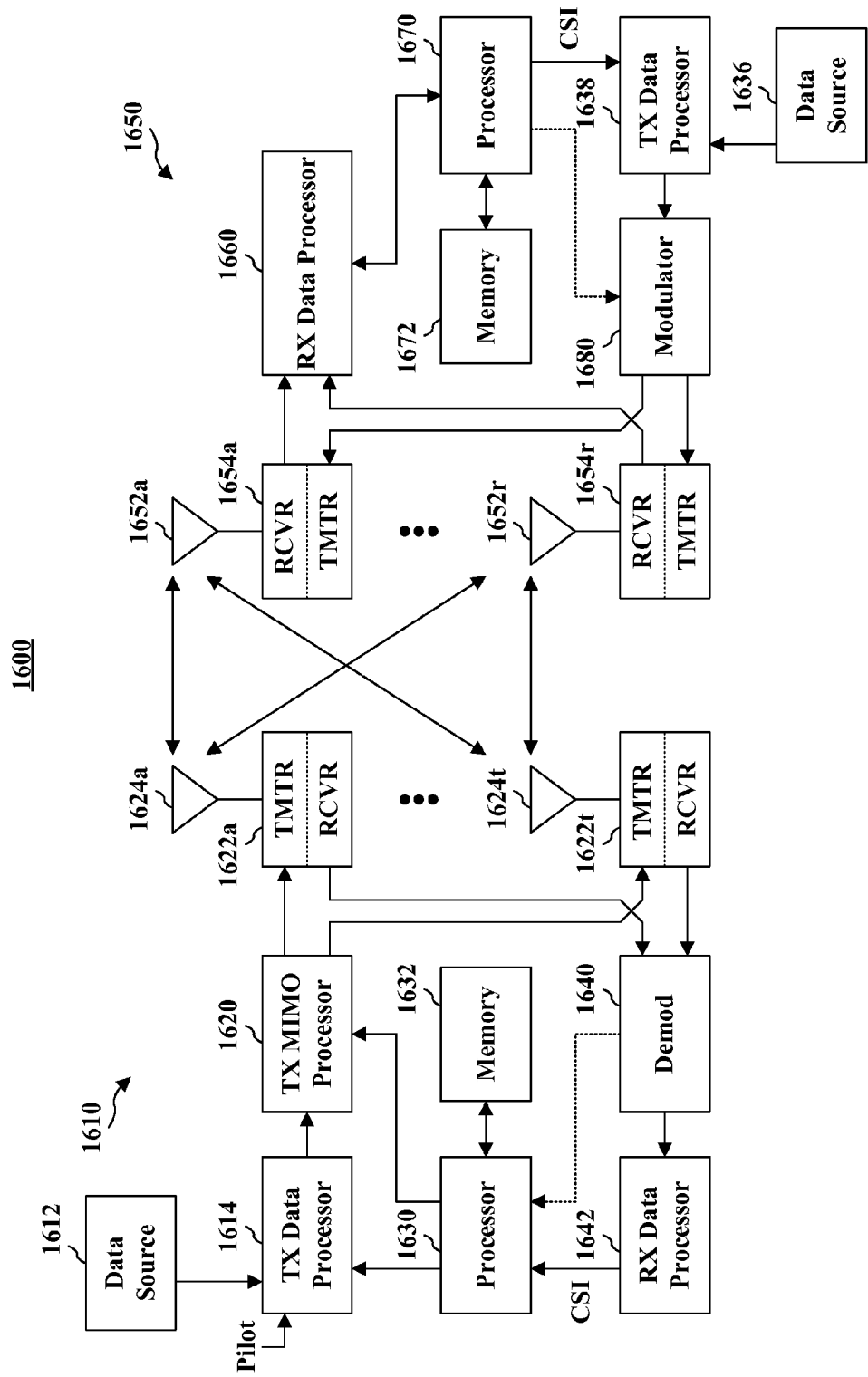
FIG. 16 is a block diagram illustrating an example wireless communication system in which various aspects described herein can function.

FIG. 16 shows an example wireless communication system 1600. The wireless communication system 1600 depicts one base station 1610 and one access terminal 1650 for sake of brevity. However, it is to be appreciated that system 1600 can include more than one base station and/or more than one access terminal, wherein additional base stations and/or access terminals can be substantially similar or different from example base station 1610 and access terminal 1650 described below. In addition, it is to be appreciated that base station 1610 and/or access terminal 1650 can employ the systems (FIGS. 1, 2, 3, 4, 5, 6, and 12) and/or method (FIGS. 7-11) described herein to facilitate wireless communication there between.

At base station 1610, traffic data for a number of data streams is provided from a data source 1612 to a transmit (TX) data processor 1614. According to an example, each data stream can be transmitted over a respective antenna. TX data processor 1614 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1650 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1630.

The modulation symbols for the data streams can be provided to a TX MIMO processor 1620, which can further process the modulation symbols (e.g., for OFDM). TX MIMO processor 1620 then provides $N_T$ modulation symbol streams to $N_T$ transmitters (TMTR) 1622a through 1622t. In various embodiments, TX MIMO processor 1620 applies beamforming weights to the symbols of the data streams and to the antenna from which the symbol is being transmitted.

Each transmitter 1622 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1622a through 1622t are transmitted from $N_T$ antennas 1624a through 1624t, respectively.

At access terminal 1650, the transmitted modulated signals are received by $N_R$ antennas 1652a through 1652r and the received signal from each antenna 1652 is provided to a respective receiver (RCVR) 1654a through 1654r. Each receiver 1654 conditions (e.g., filters, amplifies, and downconverts) a respective signal, digitizes the conditioned signal to provide samples, and further processes the samples to provide a corresponding "received" symbol stream.

An RX data processor 1660 can receive and process the $N_R$ received symbol streams from $N_R$ receivers 1654 based on a particular receiver processing technique to provide $N_T$ "detected" symbol streams. RX data processor 1660 can demodulate, deinterleave, and decode each detected symbol stream to recover the traffic data for the data stream. The processing by RX data processor 1660 is complementary to that performed by TX MIMO processor 1620 and TX data processor 1614 at base station 1610.

A processor 1670 can periodically determine which available technology to utilize as discussed above. Further, processor 1670 can formulate a reverse link message comprising a matrix index portion and a rank value portion.

The reverse link message can comprise various types of information regarding the communication link and/or the received data stream. The reverse link message can be processed by a TX data processor 1638, which also receives traffic data for a number of data streams from a data source 1636, modulated by a modulator 1680, conditioned by transmitters 1654a through 1654r, and transmitted back to base station 1610.

At base station 1610, the modulated signals from access terminal 1650 are received by antennas 1624, conditioned by receivers 1622, demodulated by a demodulator 1640, and processed by a RX data processor 1642 to extract the reverse link message transmitted by access terminal 1650. Further, processor 1630 can process the extracted message to determine which precoding matrix to use for determining the beamforming weights.

Processors 1630 and 1670 can direct (e.g., control, coordinate, manage, etc.) operation at base station 1610 and access terminal 1650, respectively. Respective processors 1630 and 1670 can be associated with memory 1632 and 1672 that store program codes and data. Processors 1630 and 1670 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   measuring a characteristic of a radio link between a mobile device and a base station to generate a measurement value;
   receiving a system information block broadcast by the base station;
   extracting information from the system information block to generate a set of random access channel configurations, wherein the information specifies available random access channel configurations; and
   selecting, in accordance with the measurement value, a random access channel format from the set of random access channel configurations to transmit a random access preamble to the base station.

2. The method of claim 1, further comprising generating a set of thresholds based on the information extracted from the system information block, wherein the set of thresholds includes one or more values related to the characteristic of the radio link which is measured.

3. The method of claim 2, wherein the system information block specifies available random access channel configurations and threshold values; and the method further comprises:
   generating the set of configurations from the available random access channel configurations specified; and
   generating the set of thresholds from the threshold values specified.

4. The method of claim 3, wherein a size of the set of configurations is one more than a size of the set of thresholds.

5. The method of claim 2, further comprising:
   comparing the measurement value with the set of thresholds; and
   identifying a placement of the measurement value within an ordered list of thresholds from the set of thresholds.

6. The method of claim 5, further comprising:
   selecting a first random access channel format when the measurement value is below a first threshold of the set of thresholds; and
   selecting a second random access channel format when the measurement value is above the first threshold.

7. The method of claim 1, further comprising identifying a component carrier on which random access is occurring, wherein the characteristic of the radio link and the set of random access channel configurations are unique to the component carrier identified.

8. The method of claim 1, further comprising:
   transmitting the measurement value to the base station; and
   receiving an explicit indication that specifies the random access channel format.

9. The method of claim 1, wherein the characteristic is at least one of pathloss, propagation delay, or distance.

10. The method of claim 1, further comprising transmitting the random access preamble to the base station on a set of resources, wherein the random access preamble is constructed in accordance with the random access channel format selected and the set of resources being uniquely associated with the random access channel format selected.

11. The method of claim 1, wherein the random access channel format comprises a short cyclic prefix, a short guard time, and a short duration.

12. The method of claim 1, wherein the random access channel format comprises a long cyclic prefix, a short guard time, and a short duration.

13. The method of claim 1, wherein the random access channel format comprises a long cyclic prefix, a long guard time, and a short duration.

14. The method of claim 1, wherein the random access channel format comprises a long cyclic prefix, a long guard time, and a long duration.

15. The method of claim 1, wherein the random access channel format comprises a short cyclic prefix, a short guard time, and a long duration.

16. A wireless communication apparatus, comprising: at least one processor configured to:
   measure a characteristic of a radio link between the wireless communication apparatus and a base station to generate a measurement value;
   receive a system information block broadcast by the base station;
   extract information from the system information block to generate a set of random access channel configurations, wherein the information specifies available random access channel configurations; and
   select, in accordance with the measurement value, a random access channel format from the set of random access channel configurations to transmit a random access preamble to the base station.

17. The wireless communication apparatus of claim 16, wherein the at least one processor is further configured to generate a set of thresholds based on the information extracted from the system information block, and wherein the set of thresholds includes one or more values related to the characteristic of the radio link which is measured.

18. The wireless communication apparatus of claim 17, wherein the system information block specifies available random access channel configurations and threshold values, and wherein the at least one processor is further configured to:
   generate the set of configurations from the available random access channel configurations specified; and
   generate the set of thresholds from the threshold values specified.

19. The wireless communication apparatus of claim 17, wherein the at least one processor is further configured to:
   compare the measurement value with the set of thresholds; and
   identify a placement of the measurement value within an ordered list of thresholds from the set of thresholds.

20. The wireless communication apparatus of claim 16, wherein the at least one processor is further configured to identify a component carrier on which random access is occurring, wherein the characteristic of the radio link and the set of random access channel configurations are unique to the component carrier identified.

21. The wireless communication apparatus of claim 16, wherein the at least one processor is further configured to:
   transmit the measurement value to the base station; and
   receive an explicit indication that specifies the random access channel format.

22. The wireless communication apparatus of claim 16, wherein the at least one processor is further configured to transmit the random access preamble to the base station on a set of resources, wherein the random access preamble is constructed in accordance with the random access channel format selected and the set of resources being uniquely associated with the random access channel format selected.

23. An apparatus, comprising:
   means for measuring a characteristic of a radio link between the apparatus and a base station to generate a measurement value;

means for receiving a system information block broadcast by the base station;

means for extracting information from the system information block to generate a set of random access channel configurations, wherein the information specifies available random access channel configurations; and means for selecting, in accordance with the measurement value, a random access channel format from the set of random access channel configurations to transmit a random access preamble to the base station.

24. The apparatus of claim 23, wherein the means for extracting generates a set of thresholds based on the information extracted from the system information block, and wherein the set of thresholds includes one or more values related to the characteristic of the radio link which is measured.

25. The apparatus of claim 24, wherein the system information block specifies available random access channel configurations and threshold values; and
the means for extracting generates the set of configurations from the available random access channel configurations specified and generates the set of thresholds from the threshold values specified.

26. The apparatus of claim 24, further comprising means for comparing the measurement value with the set of thresholds.

27. The apparatus of claim 23, further comprising means for identifying a component carrier on which random access is occurring, wherein the characteristic of the radio link and the set of random access channel configurations are unique to the component carrier identified.

28. The apparatus of claim 23, further comprising:
means for transmitting information to the base station, the means for transmitting conveys the measurement value to the base station; and
means for receiving information from the base station, the means for receiving obtains an explicit indication that specifies the random access channel format.

29. The apparatus of claim 23, further comprising means for transmitting information to the base station, the means for transmitting transmits the random access preamble to the base station on a set of resources, wherein the random access preamble is constructed in accordance with the random access channel format selected and the set of resources being uniquely associated with the random access channel format selected.

30. A computer program product, comprising:
a non-transitory computer-readable medium, comprising:
code for causing at least one computer to measure a characteristic of a radio link between a mobile device and a base station to generate a measurement value;
code for causing the at least one computer to receive a system information block broadcast by the base station;
code for causing the at least one computer to extract information from the system information block to generate a set of random access channel configurations, wherein the information specifies available random access channel configurations; and
code for causing the at least one computer to select, in accordance with the measurement value, a random access channel format from the set of random access channel configurations to transmit a random access preamble to the base station.

31. The computer program product of claim 30, wherein the non-transitory computer-readable medium further comprises code for causing the at least one computer to generate a set of thresholds based on the information extracted from the system inforamtion block, and wherein the set of thresholds includes one or more values related to the characteristic of the radio link which is measured.

32. The computer program product of claim 31, wherein the system information block specifies available random access channel configurations and threshold values; and
the non-transitory computer-readable medium further comprises:
code for causing the at least one computer to generate the set of configurations from the available random access channel configurations specified; and
code for causing the at least one computer to generate the set of thresholds from the threshold values specified.

33. The computer program product of claim 31, wherein the non-transitory computer-readable medium further comprises:
code for causing the at least one computer to compare the measurement value with the set of thresholds; and
code for causing the at least one computer to identify a placement of the measurement value within an ordered list of thresholds from the set of thresholds.

34. The computer program product of claim 30, wherein the non-transitory computer-readable medium further comprises code for causing the at least one computer to identify a component carrier on which random access is occurring, wherein the characteristic of the radio link and the set of random access channel configurations are unique to the component carrier identified.

35. The computer program product of claim 30, wherein the non-transitory computer-readable medium further comprises:
code for causing the at least one computer to transmit the measurement value to the base station; and
code for causing the at least one computer to receive an explicit indication that specifies the random access channel format.

36. The computer program product of claim 30, wherein the non-transitory computer-readable medium further comprises code for causing the at least one computer to transmit the random access preamble to the base station on a set of resources, wherein the random access preamble is constructed in accordance with the random access channel format selected and the set of resources being uniquely associated with the random access channel format selected.

37. An apparatus, comprising:
a measurement module configured to generate an estimate, wherein the estimate relates to at least one characteristic of a radio link between the apparatus and a base station;
a system information module configured to extract information from a system information block received from the base station, wherein the information specifies available random access channel configurations, to generate a set of random access channel configurations from the available random access channel configurations; and
a random access module configured to select a random access channel format based at least in part on the estimate and employs the random access channel format selected to transmit a random access preamble to the base station.

38. The apparatus of claim 37, further comprising:
a memory configured to store the set of random access channel configurations and a set of thresholds generated from the information extracted from the system information block.

39. The apparatus of claim 38, wherein the memory is configured to store disparate sets of random access channel configurations and disparate sets of thresholds for each component carrier for which the apparatus is configured to employ.

40. The apparatus of claim 37, further comprising:
- a comparison module configured to compare the estimate to a set of thresholds; and
- a selection module configured to identify the random access channel format from the set of random access channel configurations based at least in part on results from the comparison module.

* * * * *